May 5, 1970 J. L. EVANS 3,509,774
PNEUMATIC ACCELEROMETER
Filed Jan. 10, 1967 3 Sheets-Sheet 1
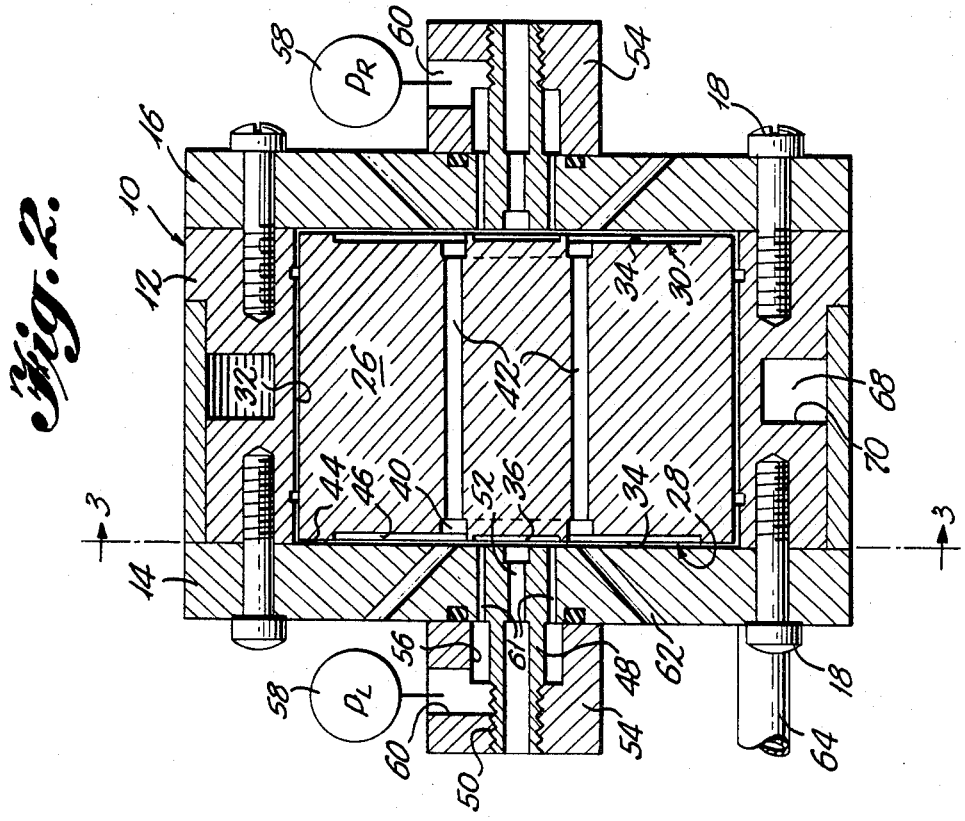
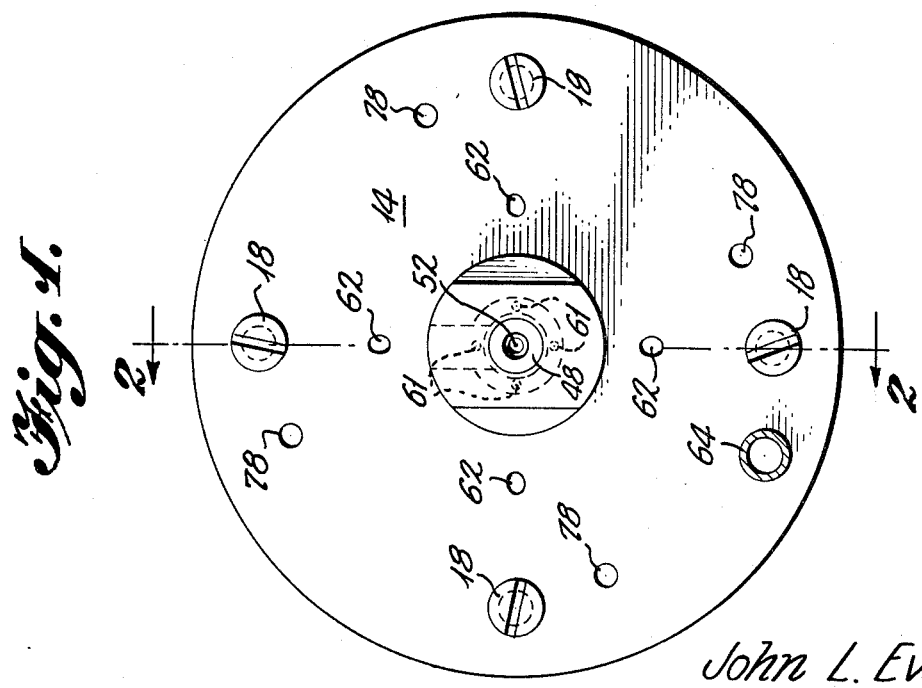
INVENTOR
John L. Evans
BY S. A. Giarratana +
K. A. Ohralik
ATTORNEYS May 5, 1970  J. L. EVANS  3,509,774
PNEUMATIC ACCELEROMETER Filed Jan. 10, 1967  3 Sheets-Sheet 2

INVENTOR
John L. Evans
BY S. A. Giarratana &
K. A. Ohralik
ATTORNEYS

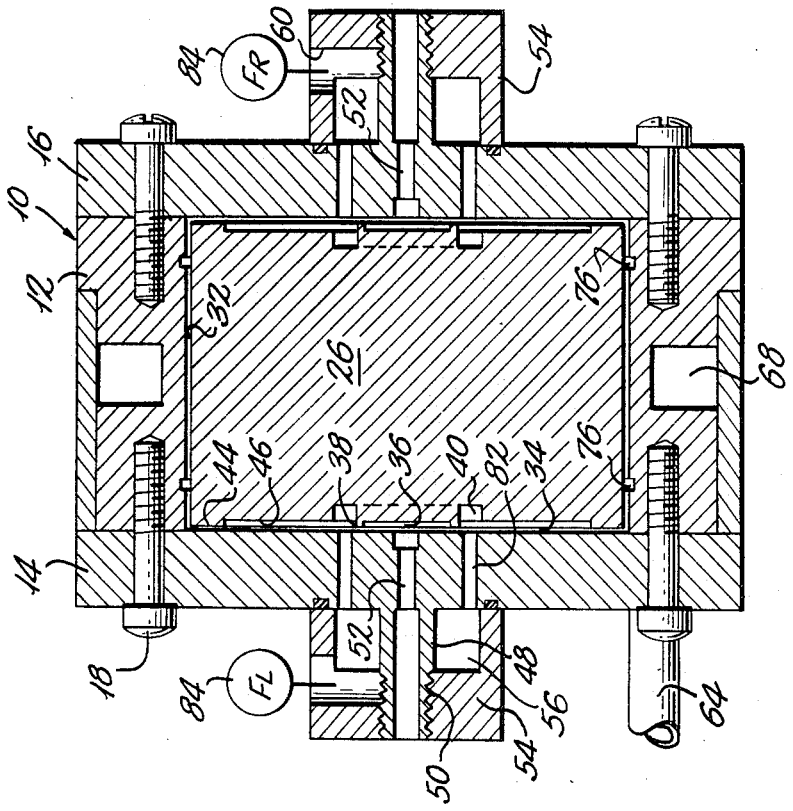
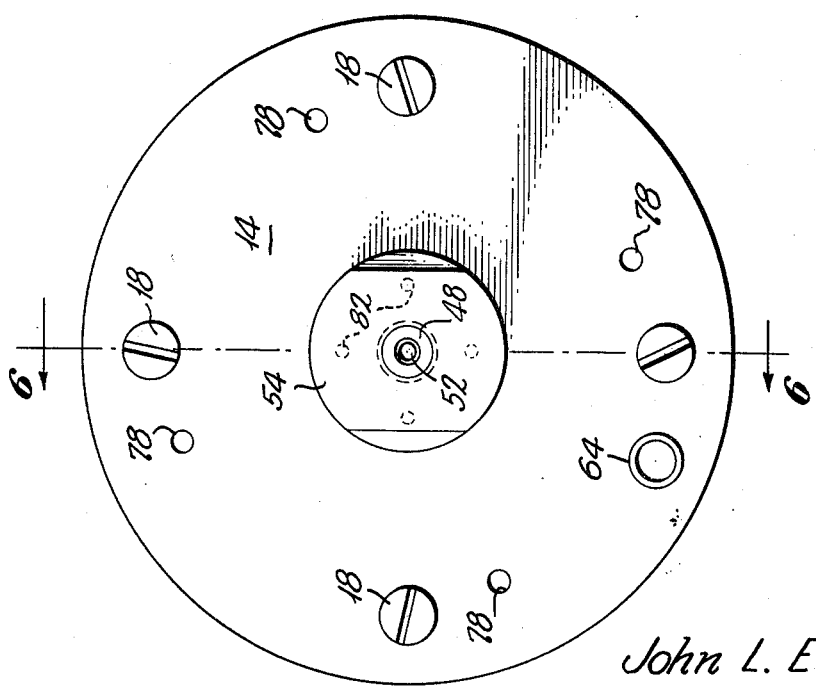

United States Patent Office 3,509,774
Patented May 5, 1970

3,509,774
PNEUMATIC ACCELEROMETER
John L. Evans, Oakland, N.J., assignor to Singer-General Precision, Inc., a corporation of Delaware
Filed Jan. 10, 1967, Ser. No. 608,442
Int. Cl. G01p 15/02
U.S. Cl. 73—515
9 Claims

ABSTRACT OF THE DISCLOSURE

The invention is a pneumatic accelerometer in which a cylindrical inertial member or mass is supported radially in a cylindrical chamber by a gas bearing. The gas bearing is developed by introducing air circumferentially at the axial center of the chamber and exhausting the same through vents opening to circumferential grooves in the chamber walls, the grooves being spaced equally on each side of the axial center so that a flow path of uniform length for the bearing gas is established. Two embodiments are disclosed. One embodiment is designed for a differential pressure output signal whereas the other is adapted for a differential flow output signal. In both embodiments, pressurized working gas is introduced into a shallow cylindrical void formed at the center of each radial end face on the inertial element. The void is circumscribed by a lip which controls the passage of working gas from the void to venting apertures.

BACKGROUND OF THE INVENTION

This invention relates to accelerometers and more particularly, it concerns pneumatic accelerometers of the type in which relative movement between an inertial mass and a housing or other body experiencing acceleration effects a pneumatic output signal variation proportional to the forces of acceleration.

Pneumatic accelerometers heretofore available have employed generally an inertial mass supported for movement with respect to a pair of nozzles or apertures by which a working fluid, such as air, is impinged against surfaces on the mass. The nozzles or apertures are fixed in a housing or the like so that movement of the mass between the nozzles provides an output signal, in the form of either a pressure or a flow differential between the respective nozzles or apertures, which is proportional to acceleration. One of the major problems with accelerometers of this type has been that of supporting the inertial mass so that the restraining forces acting thereon remains constant over its movement relative to the respective flow nozzles. For example, various supporting devices such as pivots, diaphragms, springs, and the like have been used, each of which involves some measure of variable restraint on the inertial mass, thereby detracting from the accuracy of the output signal.

SUMMARY OF THE INVENTION

In accordance with the present invention, an improved pneumatic accelerometer is provided in which a cylindrical inertial mass is radially supported by a pressurized gas bearing within a cylindrical chamber defined by a housing having a central orifice in each end wall thereof. The radial end faces of the inertial mass are provided with shallow cylindrical chambers or recesses in the vicinity of the aforementioned nozzles and circumscribed by an axially projecting annular ridge or lip capable of isolating fluid in the chamber when the inertial mass moves against the adjacent end wall of the housing. Air vents are provided in the housing end walls outwardly from the annular ridges in the inertial mass so that the passage of gas in through the central nozzles and out through the air vents is controlled by the proximity of the annular projection to the end wall of that nozzle. Where a pressure signal is desired, it is tapped off from the inertial member end face chamber on each end of the housing. If a differential flow signal is desired, the flow of gas through the vents is measured. Damping of the inertial mass in the chamber is accomplished by a gas squeeze film developed between the housing end walls and an accurately machined radial face provided on an annular boss on each end of the mass near the outer edge thereof.

A principal object of the present invention is therefore to provide a pneumatic accelerometer in which uniform restraint on the inertial mass thereof is maintained during movement of the mass relative to a pair of air nozzles or orifices.

Another object of this invention is to provide a pneumatic accelerometer which involves a minimum of parts that may be formed by well known machining techniques and which is capable of miniaturization.

A further object of this invention is to provide a pneumatic accelerometer of the type referred to which is readily adaptable to provide either a pressure signal or a flow signal.

Other objects and further scope of applicability of the present invention will become apparent from the detailed description to follow, taken in conjunction with the accompanying drawing.

BRIEF DESCRIPTION OF THE DRAWINGS

In the drawing, wherein like reference numerals designate like parts:

FIG. 1 is an end view of one embodiment of this invention;

FIG. 2 is a cross-section taken on line 2—2 of FIG. 1;

FIG. 5 is an end view illustrating a modified embodiment of the present invention; and, FIG. 6 is a cross-section taken on line 6—6 of FIG. 5.

DESCRIPTION OF THE PREFERRED EMBODIMENTS

Figure 4:
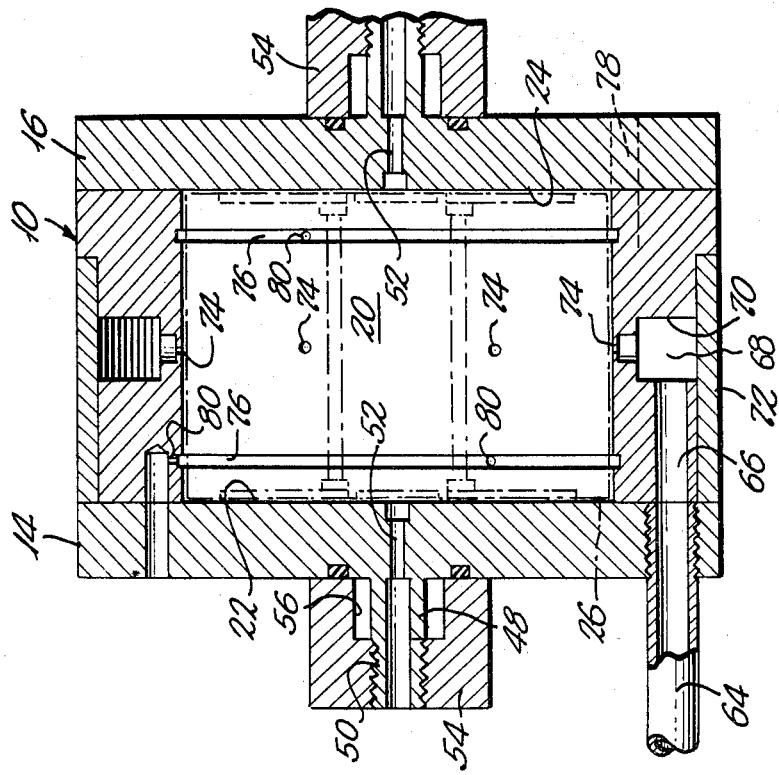
FIG. 4 is a cross-section taken on line 4—4 of FIG. 3.
Figure 3:
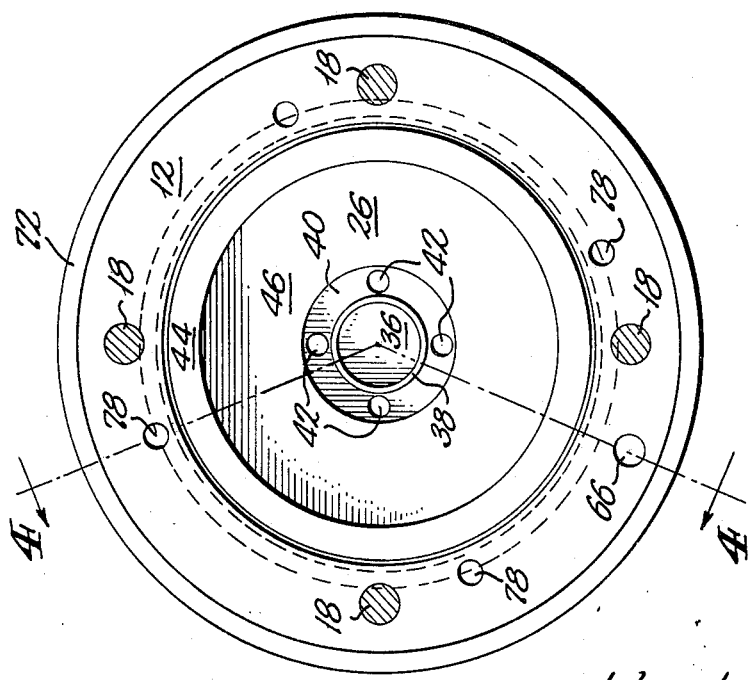
FIG. 3 is a cross-section taken on line 3—3 of FIG. 2.

The embodiment illustrated in FIGS. 1–4 of the drawings is particularly suited for use under circumstances where a pressure-type output signal is desired. As shown, the accelerometer of this embodiment includes a housing generally designated by the reference numeral 10. The housing includes a central annular part 12 and a pair of circular end walls 14 and 16 secured respectively to the left and right ends of the annular part 12 by suitable means such as screw bolts 18. Thus, it will be seen that the housing 10 establishes a cylindrical interior chamber 20 having mutually facing flat radial surfaces 22 and 24 at each end thereof as established by the walls 14 and 16, respectively.

Positioned within the chamber 20 is a cylindrical inertial mass 26 having a pair of identically shaped radial end faces 28 and 30. The radial and axial dimensions of the mass 26 are slightly smaller than the corresponding dimensions of the chamber 20 to provide circumferential and end clearance gaps 32 and 34, respectively. As shown most clearly in FIGS. 2 and 3 of the drawings, each of the end faces 28 and 30 on the inertial mass 26 is formed having a shallow cylindrical void or chamber 36 circumscribed by an annular lip 38 projecting axially relative to the chamber 36 to a point flush with the respective radial end faces 28 and 30. The lips 38, in turn, are circumscribed by a relatively deep annular groove 40 at each end of the mass 26, which grooves in the embodiment of FIGS. 1–4 are interconnected by axial bores 42. At the outer edge on each end of the mass 26 a circular boss 44 is formed to establish a gas squeeze film for damping to be described in more detail below. The radial width of the boss 44 is established by an annular recess 46 formed in each end of the end face of the mass and extending between the grooves 40 and the bosses 44.

Each of the end walls 14 and 16 includes an axiallly projecting central boss 48 having a threaded portion 50 at the outer end thereof and is centrally counter-bored to provide a dropping orifice 52. Threadably mounted on each of the bosses 48 is an output adaptor 54 having a counter bore 56 to define an annular chamber in communication with pressure sensing means 58 through a radial tap 60. A plurality of small bores 61 are drilled in each of the end walls 14 and 16 about the bosses 48 therein to establish fluid communication between the annular chamber 56 and the shallow cylinder voids or chambers 36 in the inertial mass 26. A plurality of radially inclined venting apertures 62 are also drilled through each of the end walls in position such that the inner ends thereof lie outwardly of the lips 38 on the inertial mass 26 and in the vicinity of the grooves 40.

To support the mass 26 radially or concentrically within the chamber 20, an air bearing is developed in the centrifugal gap 32 by gas circulating means shown most clearly in FIG. 4 of the drawings. Gas from a suitable source (not shown) is fed by a threaded coupling member 64 through an axial bore 66 in the housing central part 12 and into an annular plenum 68 formed by a circumferential groove 70 together with a ring-like plenum cover 72. Air under pressure from the plenum 68 then passes into the clearance gap 32 through a series of orifices 74 spaced uniformly about the inner cylinder surface of the chamber 20. The orifices 74 are spaced centrally between the end faces 22 and 24 of the chamber 20 and preferably, eight such orifices are provided on 45 degree angle centers. The end walls 14 and 16 are identical so that in practice, a second inlet bore, like the axial bore 66, opens through the end wall 16 at a point spaced approximately 180 degrees from the bore 66. In this manner, a uniform pressure supply in the plenum to the respective apertures 74 is maintained.

Air introduced to the circumferential clearance gap 32 through the apertures 74 in the manner explained above is exhausted into a pair of circumferential grooves 76 spaced equally to the left and right hand sides of the apertures 74. Each of the grooves communicates with venting ports 78 through orifices 80 opening between the bottom of the grooves 76 and the axially disposed venting ports 78. In the disclosed embodiment, four venting ports 78 are provided in each side of the housing 10 with the orifices 80 thereof displaced 45 degrees with respect to each other. Also, it is preferred that the orifices 80 be on the same angular center lines as alternate ones of the inlet apertures 74 to assure a symmetrical flow of air in the circumferential gap between the inlet aperture 74 and the outlet orifices 80.

In operation, pressurized working gas originating from a single source (not shown) is introduced into the dropping orifices 52 in each of the housing end walls 14 and 16. In such operation, it is assumed that the gas bearing air supply described above is also connected to retain the mass 26 in general concentricity within the chamber 20. When the housing 10 is stationary, or otherwise not undergoing acceleration, the pressure in the chambers 36 at opposite ends of the mass will be equal or, the left side pressure $P_l$ will be equal to the right side pressure $P_r$. When, however, the housing 10 is subjected to acceleration, for example in a left direction, there will be a reduction in gas flow between the end of the lip 38 and the radial face 24 on the right side accompanied by a corresponding increase in gas flow between the lip 38 and the end face 22 on the left. Assuming a constant input pressure through the dropping orifices 52, $P_r$ will increase while $P_l$ will decrease. The fundamental equation of the accelerator shown in FIGS. 1, 2 and 4 is therefore:

$$(P_r - P_l)A = MG$$

where:

$P_r$ and $P_l$ are the pressures in the right and left cylindrical chambers 36
A is the area of the cylindrical chambers 36
M is the inertial mass 26
G is the local acceleration It will be noted that because of the bores 42 through the mass, the sole pressure differential acting on the opposite ends of the inertial mass 26 is as a result of the pressures in the left and right hand chambers 36. Also, the circular bosses 44 at the outer edge of the inertial mass function to damp movement of the mass 26 against either of the chamber end faces 22 or 24. This damping is accomplished by a gas squeeze film between the radial surfaces on the bosses 44 and the chamber end faces. Motion of the mass 26 will change the volume of the squeeze film appreciably causing gas to flow radially inward or outward. This minute flow of gas causes viscous dissipation of energy resulting in the desired damping restraint of the inertial mass motion.

Also, it will be noted that undesirable variation of restraining forces acting on the inertial mass 26, due to its support relative to the housing, are minimized by the particular gas bearing arrangement developed in the circumferential gap 32. Contributing significantly to this minimizing of restraining force variation is the venting of the two grooves 76 to atmosphere through the ports 78 and by maintaining the length of the flow path between the inlet orifices 74 and the grooves constant at all times. Hence, there is no change in the drag forces acting on the accelerometer regardless of the relative position of the inertial mass 26 and the housing 10.

The embodiment of FIGS. 5 and 6 is particularly suited for circumstances in which a differential flow signal is desired. The overall construction of the embodiment of FIGS. 5 and 6 is essentially the same as that of FIGS. 1–4 with the exception that the pressure balancing apertures 42 are not provided and gas flow out of the end chambers 36 in the inertial mass is measured as distinguished from the pressure thereof. Accordingly, axial vent ports 82 displaced radially outwardly of the lip 38 communicate directly into the chamber 56 of the adaptor 54 which may be enlarged slightly in diameter. Flow measuring means 84 is connected to the radial port 60 in the adaptor in lieu of the pressure measuring means 58 of the embodiment of FIGS. 1–4.

The operation of the embodiment of FIGS. 5 and 6 is the same as that of FIGS. 1–4 with the exception that the flow rates $F_l$ and $F_r$ are measured and used to provide a function of the acceleration force. The quantities of the flow $F_l$ and $F_r$ are directly proportional to the pressures $P_l$ and $P_r$ in the above mentioned equation so long as the pressures are maintained above the critical pressure ratio for the ambient pressure of the working gas.

Thus, it will be apparent that by this invention, an improved pneumatic accelerometer is provided by which the aforementioned objectives are completely fulfilled. Since various modifications other than those described and illustrated herein are possible, it is expressly intended that the foregoing description is illustrative of preferred embodiments only, not limiting, and that the true spirit and scope of the present invention is to be determined by reference to the appended claims.

What is claimed is:

1. A pneumatic accelerometer comprising: a housing (10) defining a cylindrical chamber (20) having flat radial faces (22, 24) at each end thereof, a cylindrical mass (26) having radial end faces (28, 30) positioned in said chamber, the relative dimensions of said mass and said chamber providing circumferential and end clearance gaps (32, 34), means to support said mass in general concentricity with said chamber, said mass having a shallow axial void (36) formed in each end face thereof circumscribed by a lip (38) terminating flush with the radial ends faces of said mass, said housing having a pair of working gas inlet orifices to direct working gas into the axial voids on each end of said mass, said mass having a relatively deep annular groove (40) formed in each end face thereof circumscribing said lip (38), said mass also having axial bores (42) extending between the end faces thereof, said axial bores opening into said relatively deep annular grooves (40), venting apertures opening through said chamber end faces at locations outwardly of said lip (38) and, displacement detection means (58, 84) disposed outwards of said chamber (20) and connected with at least one end of said chamber sensing the displacement of said mass within said chamber as a function of the gas activity therein, the movement of said mass in an axial direction relative to said housing operating to control the working gas passage between said lips and said chamber end faces.

2. The apparatus recited in claim 1, wherein said displacement detection means are gas pressure sensing means sensing the working gas pressure in said axial voids.

3. The apparatus recited in claim 1 wherein said displacement detection means are gas flow sensing means sensing the working gas flow through said venting apertures.

4. The apparatus recited in claim 1, including an annular surface flush with each of the end faces on said mass to develop a gas squeeze film with the chamber end faces for damping movement of said mass in said chamber.

5. The apparatus recited in claim 4 in which said means to support said mass includes means to develop an axial gas flow path of uniform length in said circumferential gap to provide a gas bearing which exerts a constant drag on said mass irrespective of its relative position in said chamber.

6. The apparatus recited in claim 5 in which said housing comprises: a central annular part to establish the circumferential surface of said chamber and a pair of end walls to establish the flat radial faces at each end of said chamber, said annular part having an external circumferential groove to provide a plenum, and radial gas inlet apertures extending from the base of said plenum to said circumferential surface.

7. The apparatus recited in claim 6 in which said housing has a pair of internal radial grooves opening to said circumferential surface and radial venting apertures opening to the bottom of said grooves, said grooves being equally spaced on opposite sides of said radial inlet apertures.

8. The apparatus recited in claim 7 including aligned axial bores formed in said end walls and said annular part, said axial bores communicating respectively with said internal and external grooves.

9. The apparatus recited in claim 6 including a ring over said annular part to cover said plenum.

References Cited

UNITED STATES PATENTS

| | | | |
|---|---|---|---|
| 2,645,237 | 7/1953 | Wheeler | 73—546 XR |
| 2,695,199 | 11/1954 | Blizard | 308—9 |
| 2,788,862 | 4/1957 | Langer | 308—9 XR |
| 3,080,761 | 3/1963 | Speen | 73—516 |
| 3,315,531 | 4/1967 | Grimland | 73—515 |
| 3,322,473 | 5/1967 | Lebach | 308—9 |

JAMES J. GILL, Primary Examiner